United States Patent
Iacobovici et al.

(10) Patent No.: US 7,325,101 B1
(45) Date of Patent: Jan. 29, 2008

(54) TECHNIQUES FOR REDUCING OFF-CHIP CACHE MEMORY ACCESSES

(75) Inventors: Sorin Iacobovici, San Jose, CA (US); Paul N. Loewenstein, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 308 days.

(21) Appl. No.: 11/141,415

(22) Filed: May 31, 2005

(51) Int. Cl.
*G06F 12/00* (2006.01)
*G06F 13/00* (2006.01)

(52) U.S. Cl. .................. 711/144; 711/133; 711/159

(58) Field of Classification Search ................ 711/100, 711/117, 118, 133, 144, 154, 159
See application file for complete search history.

(56) References Cited

U.S. PATENT DOCUMENTS 5,564,035 A * 10/1996 Lai ............................ 711/144
5,787,478 A * 7/1998 Hicks et al. ................. 711/141
5,809,530 A * 9/1998 Samra et al. ................ 711/140
5,909,697 A * 6/1999 Hayes et al. ................ 711/144
6,321,297 B1 * 11/2001 Shamanna et al. .......... 711/122
6,715,040 B2 * 3/2004 Wang et al. ................ 711/133
6,748,492 B1 * 6/2004 Rowlands et al. .......... 711/128

* cited by examiner

*Primary Examiner*—Tuan V. Thai
(74) *Attorney, Agent, or Firm*—Osha·Liang LLP

(57) ABSTRACT

Cache lines stored in an on-chip cache memory are associated with one or more state bits that indicate whether data stored in the cache lines was sourced from an off-chip cache memory or a main memory. By keeping track of the source of cache lines in the on-chip cache memory and by designing the replacement algorithm of the on-chip cache memory such that only one line in a given set maps into an off-cache memory cache line, the frequency of off-chip cache memory accesses may be greatly reduced, thereby improving performance and efficiency.

30 Claims, 6 Drawing Sheets

TECHNIQUES FOR REDUCING OFF-CHIP CACHE MEMORY ACCESSES

BACKGROUND

Referring to FIG. 1, a computer system 10 typically includes at least a processor 12 having a central processing unit ("CPU") 14 for processing data (e.g., executing instructions, performing arithmetic operations). Generally, data needed for CPU 14 operations are directly or indirectly supplied from a main memory 16 operatively connected to the processor 12 by, for example, a bus (i.e., a collection of conductive pathways over which data propagates).

Because the speed at which data is obtained from main memory 16 (i.e., "memory latency") is typically significantly slower than the speed at which the CPU 14 is capable of processing data, there is a potential for much of the CPU's 14 processing time to be wasted. In other words, the CPU 14 may spend a considerable amount of its processing time "waiting" on the main memory 16.

At least partly in order to counteract the effects associated with large, slow main memories, smaller, faster memories known and referred to as "cache" memories are often used. A cache memory generally contains data (and addresses thereof) of memory locations that are frequently or has been recently used by a requesting entity (e.g., a processor). Cache memories are searched for needed data prior to searching for that data in main memory.

Still referring to FIG. 1, the CPU 14 is operatively connected to an "on-chip" cache memory 18 (cache memory 18 said to be "on-chip" due to it being disposed on processor 12). When the CPU 14 needs data for a particular processing operation, the CPU 14 sends a request for the data first to the "on-chip" cache memory 18. This request may be in the form of an address of the needed data. If an address of the requested data is found in the "on-chip" cache memory 18, a "cache hit" is said to have occurred, and the data associated with the searched-for address is returned to the CPU 14. If the address of the requested data is not found in the "on-chip" cache memory 18, a "cache miss" is said to have occurred, in which case, the request from the CPU 14 is effectively forwarded to an "off-chip" cache memory 20 operatively connected to the processor 12 (cache memory 20 said to be "off-chip" due to it being external to processor 12). If the address of the requested data is found in the "off-chip" memory 20 (i.e., a "cache hit" occurs), the data associated with the searched-for address is returned to the CPU 14. Otherwise, if the address of the requested data is not found in either the "on-chip" cache memory 18 or the "off-chip" cache memory 20, the requested data is retrieved from the relatively slow main memory 16.

Those skilled in the art will note that are various types of cache memories. FIG. 2 shows a type of commonly used cache memory 30. A description of the cache memory 30 is set forth below with reference to an address of data requested by a requesting entity (e.g., a processor), the address having 32 bits.

The cache memory 30 is formed of a tag store 32 and a data store 34. The tag store 32 is formed of x sets each having n cache blocks or "ways" (such a cache memory said to be "n-way set-associative"). A set is selected based on the "index" field (i.e., addr[12:6]) of the address of the requested data. Once a set is selected using the "index," tags in the ways of the selected set are compared against a "tag" field (i.e., addr[31:13]) of the address of the requested data (this process known and referred to as a "tag match"). If there is a match between one of the returned tags and the "tag" field of the address of the requested data, data from a corresponding way in the data store 34 is returned, where this corresponding way is part of a set selected from among y sets using the "index" and "offset" fields (i.e., addr[8:3] for 8 bytes of data) of the address of the requested data.

In order to make room for a new entry on a "cache miss," the cache memory generally has to "evict" one of the existing entries. The heuristic that the cache memory uses to choose the entry to evict is known and referred to as the "replacement policy." The fundamental problem with any replacement policy is that it must predict which existing cache entry is least likely to be used in the future. There are a variety of replacement policies to choose from and no particular one is perfect. One popular replacement policy replaces the least recently used ("LRU") entry.

When data is written to the cache memory, the data must at some point be written to main memory as well. The timing of this write is controlled by what is known and referred to as the "write policy." In a "write-through" cache memory, every write to the cache memory causes a write to main memory. Alternatively, in a "write-back" cache memory, writes are not immediately mirrored to main memory. Instead, the cache memory tracks which locations have been written over (these locations are marked "dirty"). The data in these locations is written back to main memory when that data is evicted from the cache memory. For this reason, a "cache miss" in a "write-back" cache memory will often require two memory accesses to service.

Those skilled in the art will note that the type of cache memory 30 shown in FIG. 2 may be a type of cache memory used to implement, for example, the "on-chip" cache memory 18 shown in FIG. 1. On the other hand, the "off-chip" cache memory 20 shown in FIG. 1 is often implemented as a "victim" cache (i.e., a cache memory that holds cache lines evicted from a higher-level cache memory).

SUMMARY

According to one aspect of one or more embodiments of the present invention, a system comprises: a processor; a main memory operatively connected to the processor; a first cache memory disposed on the processor; and a second cache memory external to the processor, where a cache line entry in the first cache memory is associated with a state bit indicative of whether data in the cache line entry was retrieved from one of the main memory and the second cache memory.

According to another aspect of one or more embodiments of the present invention, a method of performing computer system operations comprises: determining whether a cache miss occurs in an on-chip cache memory; and writing requested data to the on-chip cache memory from one of the off-chip cache memory and a main memory.

According to another aspect of one or more embodiments of the present invention, a method of performing computer system operations comprises: executing a computer operation; requesting data needed for the executing, where the requesting comprises issuing an address of the requested data to an on-chip cache memory; searching for the requested data in the on-chip cache memory using a portion of a first tag field in the address, where the portion of the first tag field forms at least part of an index field in the address for an off-chip cache memory, and where the portion of the first tag field does not form at least part of an index field in the address for the on-chip cache memory.

Other aspects and advantages of the invention will be apparent from the following description and the appended claims.

DETAILED DESCRIPTION

Referring again to FIG. 1, when a "cache miss" occurs in the "on-chip" cache memory 18 and a cache "line" is requested from the "off-chip" cache memory 20, one or more of the following "off-chip" cache memory access events may need to take place: searching the "off-chip" cache for the requested line and reading the line if hit; writing a cache line to be replaced in the "on-chip" cache memory 18 to the "off-chip" cache memory 20; reading the tag and data of the cache line to be replaced in the "off-chip" cache memory 20 in order to determine whether this cache line needs to be evicted prior to being overwritten; and writing back the cache line to be replaced in the "off-chip" cache memory 20 to main memory 16 if this cache line is "dirty." Those skilled in the art will note that the potential for these events to occur may increase the bandwidth requirements of the "off-chip" cache memory 20.

Figure 1:
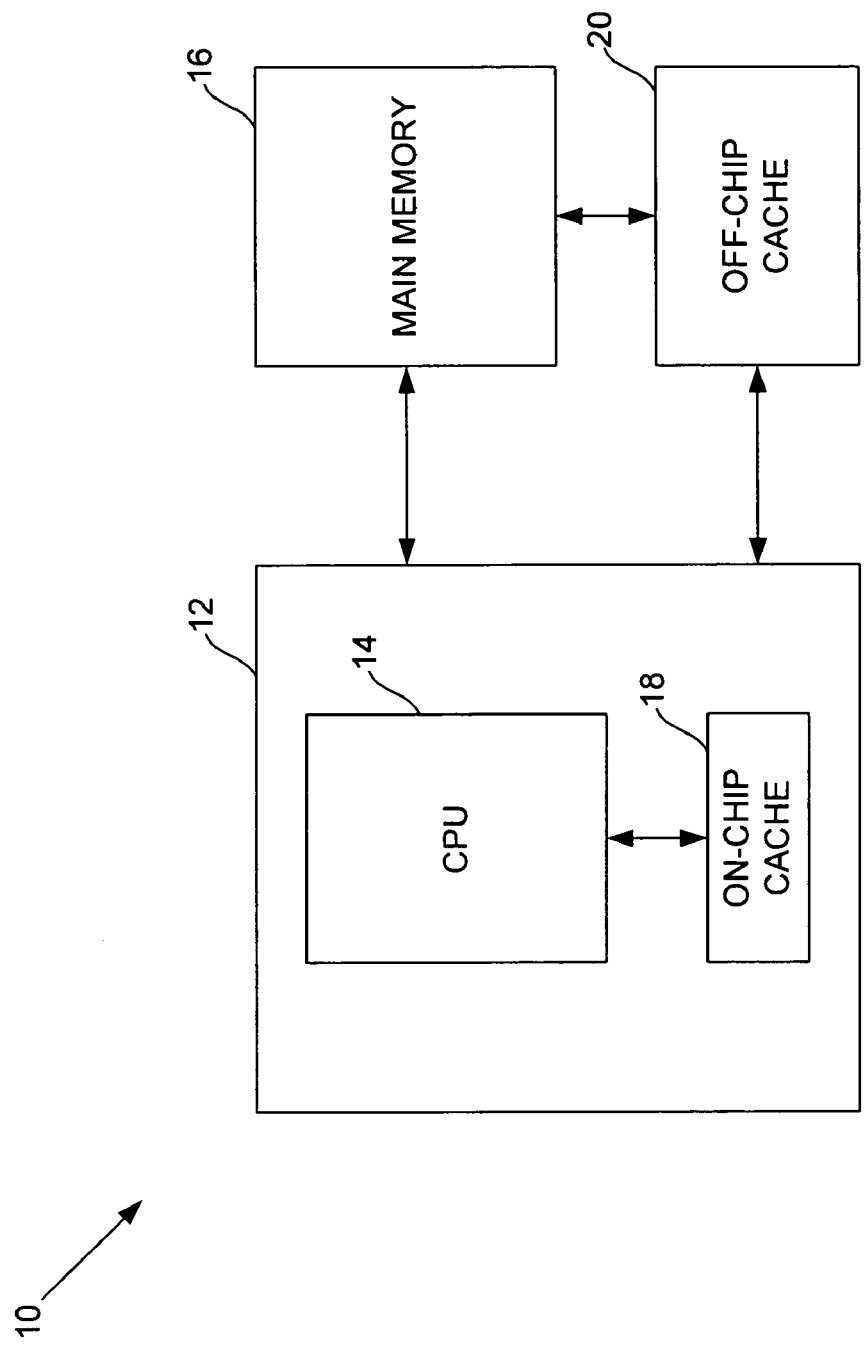
FIG. 1 shows a portion of a computer system.
Figure 2:
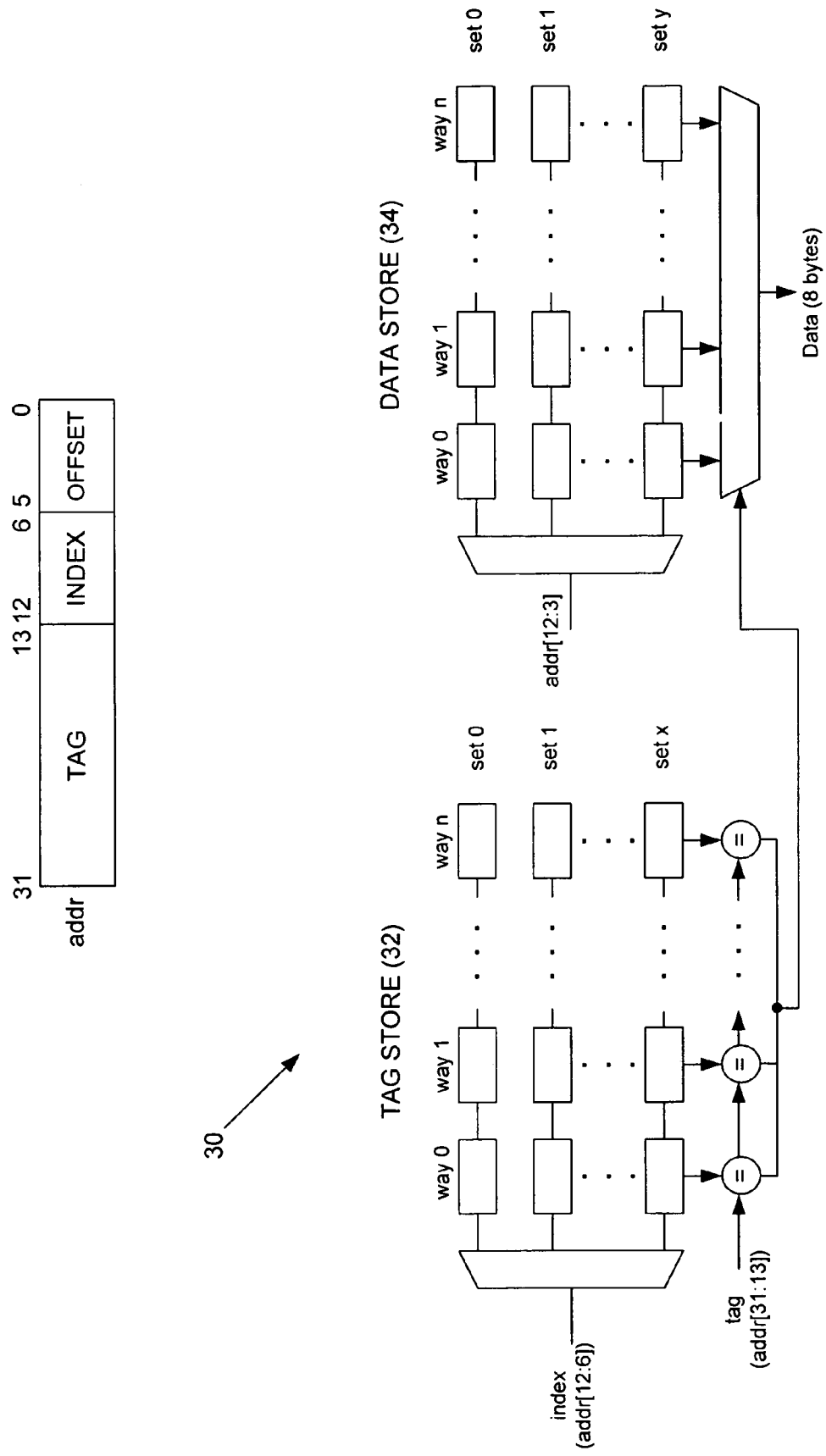
FIG. 2 shows a type of cache memory.
Figure 3:
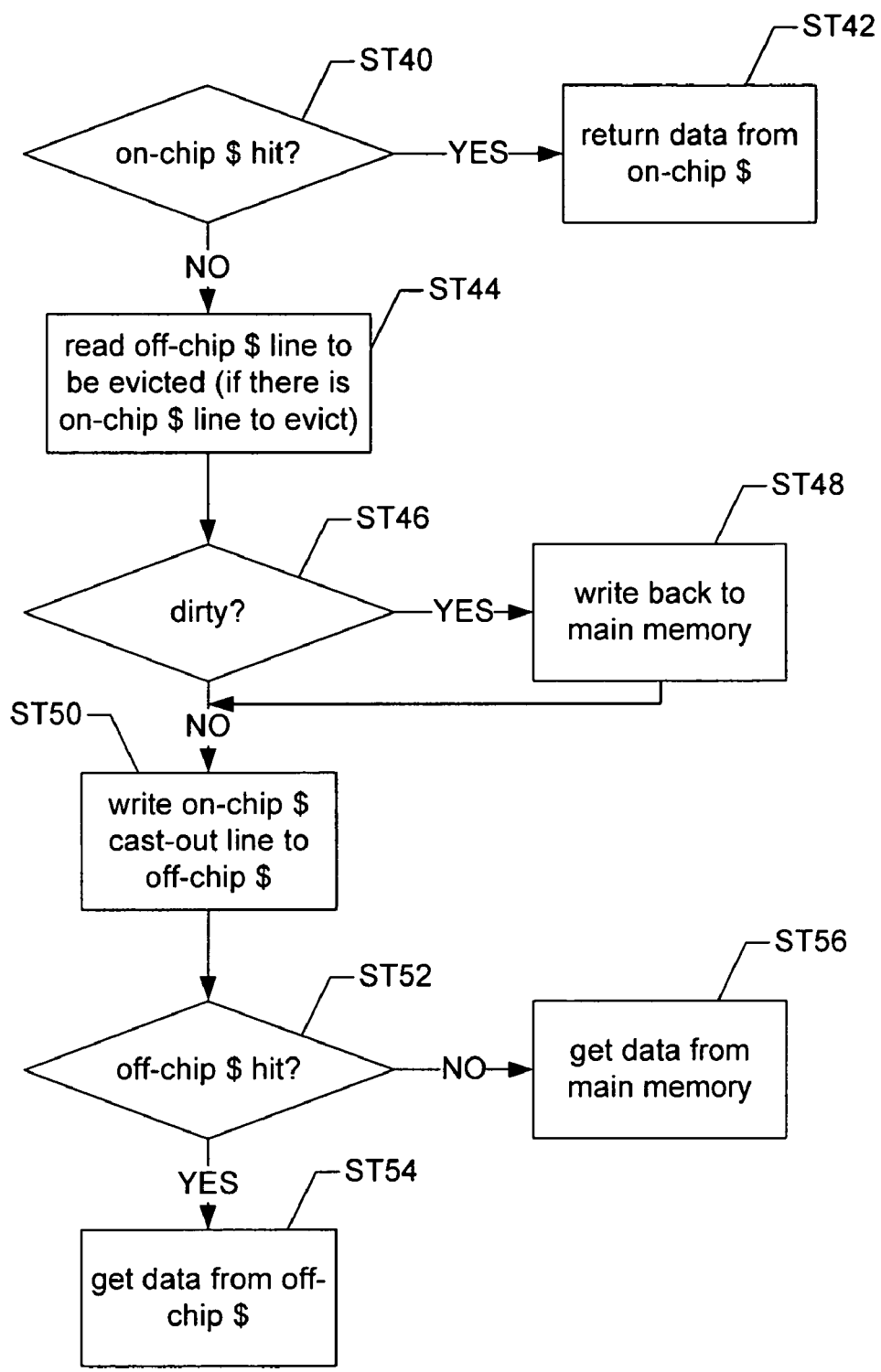
FIG. 3 shows a typical flow process.

FIG. 3 shows a flow process involving the components shown in FIG. 1. If a "cache hit" occurs in "on-chip" cache memory ("$" referring to "cache memory" in FIG. 3) ST40, the "on-chip" cache memory returns the requested data to the requesting entity (e.g., CPU 14 in FIG. 1) ST42. Otherwise, if a "cache miss" occurs in the "on-chip" cache memory ST40, the cache line in the "off-chip" cache memory to be evicted by the "cast out" cache line in the "on-chip" cache memory is read (thereby resulting in an "off-chip" cache memory access) ST44. If the read "off-chip" cache memory cache line is "dirty" ST46, this cache line is written back to main memory ST48.

After ST48 or if the "off-chip" cache memory cache line read in ST44 is not "dirty" as determined in ST46, the "on-chip" cache memory "cast out" cache line is written to the "off-chip" cache memory (thereby resulting in an "off-chip cache memory access) ST50. If the searched-for address "missed" in the "on-chip" cache memory "hits" in the "off-chip" cache memory (thereby resulting in an "off-chip" cache memory access) ST52, the requested data is returned from the "off-chip" cache memory ST54. Otherwise, if the searched-for address "missed" in the "on-chip" cache memory also "misses" in the "off-chip" cache memory ST52, the requested data is obtained from main memory ST56.

At least partly in order to reduce the bandwidth requirements needed to accommodate potential "off-chip" cache memory accesses, embodiments of the present invention relate to techniques for reducing or eliminating the need for certain "off-chip" cache memory accesses. In general, one or more embodiments of the present invention reduce or eliminate the need for certain "off-chip" cache memory accesses by keeping track of whether certain cache lines came from main memory or from "off-chip" cache memory. Those skilled in the art will note that in one or more embodiments of the present invention, the "off-chip" cache memory may be directly-mapped.

Figure 4:
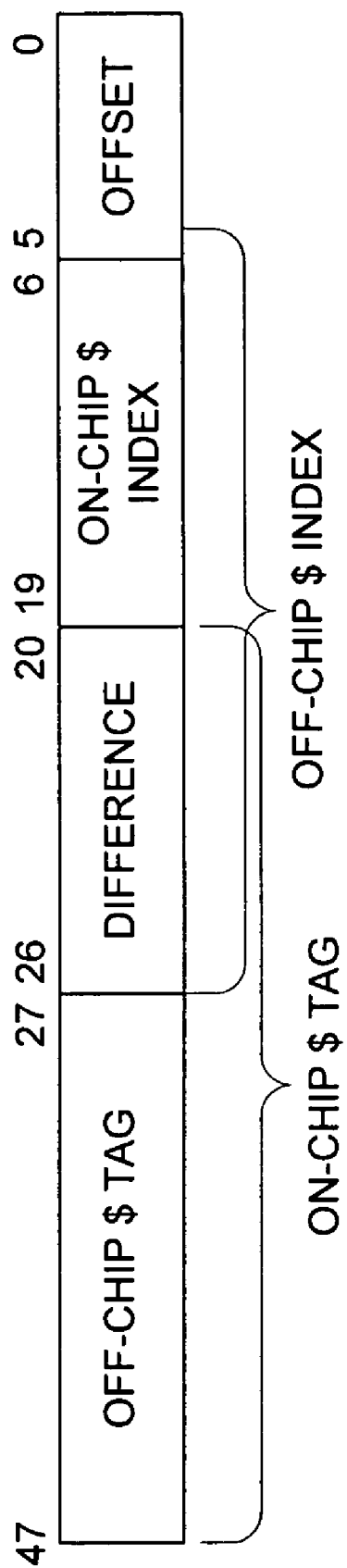
FIG. 4 shows an address arrangement in accordance with an embodiment of the present invention.

FIG. 4 shows an exemplary address arrangement usable in one or more embodiments of the present invention. In FIG. 4, the address is formed of 48 bits, where addr[47:20] forms the "on-chip" cache memory "tag," addr[19:6] forms the "on-chip" cache memory "index," addr[47:27] forms the "off-chip" cache memory "tag," addr[26:6] forms the "off-chip" cache memory "index," addr[26:20] forms a "difference" field (described further below), and addr[5:0] forms the data "offset." As evident from the arrangement of bits shown in FIG. 4, the "difference" field includes the address bits that are in the "off-chip" cache memory "index", but are not in the "on-chip" cache memory "index."

In one or more embodiments of the present invention, once a set in an "on-chip" cache memory has been selected using the "on-chip" cache memory "index" (i.e., addr[19:6]), a "tag match" is performed by (i) matching the "difference" field (i.e., addr[26:20]), and then (ii) matching the remaining "tag" bits (i.e., addr[47:27]). In one or more embodiments of the present invention, the results of (i) and (ii) may be logically ANDed together to select a particular cache line and output the requested data therein. In such a manner, because the "difference" field includes the address bits that are in the "off-chip" cache memory "index", but are not in the "on-chip" cache memory "index," there is one way in a given "on-chip" cache memory set that maps into a given "off-chip" cache memory set.

In one or more embodiments of the present invention, if there is a "difference" field match in one of the "on-chip" cache memory ways, that way may be evicted. Otherwise, if there is not a "difference" field match, a way may be evicted using, for example, an LRU replacement policy. Those skilled in the art will note that in such a manner, only one line in the "on-chip" cache memory set corresponds to an "off-chip" cache memory cache line.

In one or more embodiments of the present invention, a cache line in an "on-chip" cache memory is associated with a "source" state bit that is either (i) unasserted if the cache line was received directly from main memory or (ii) asserted if the cache line was received from an "off-chip" cache memory. When evicted, an "on-chip" cache memory cache line in a "shared" state with an asserted "source" state bit may be replaced without a write-back to the "off-chip" cache memory because that cache line is still expected to be in the "off-chip" cache memory. When evicted, a shared "on-chip" cache memory cache line with an unasserted "source" state bit may be written back to the "off-chip" cache memory before being replaced, thereby possibly involving a read of an "off-chip" cache memory cache line and a write back of the "off-chip" cache memory cache line to main memory.

When evicting a "dirty" "on-chip" cache memory cache line with an asserted "source" state bit, a write-back to the "off-chip" cache memory may be necessary. However, because that cache line is expected to still be in the "off-chip" cache memory, a tag read and match of that cache line is not necessary. When evicting a "dirty" "on-chip" cache memory cache line with an unasserted "source" state bit, that cache line may be written back to the "off-chip" cache memory before being replaced, thereby possibly involving a read of an "off-chip" cache memory cache line and a write back of the "off-chip" cache memory cache line to main memory.

Figure 5:
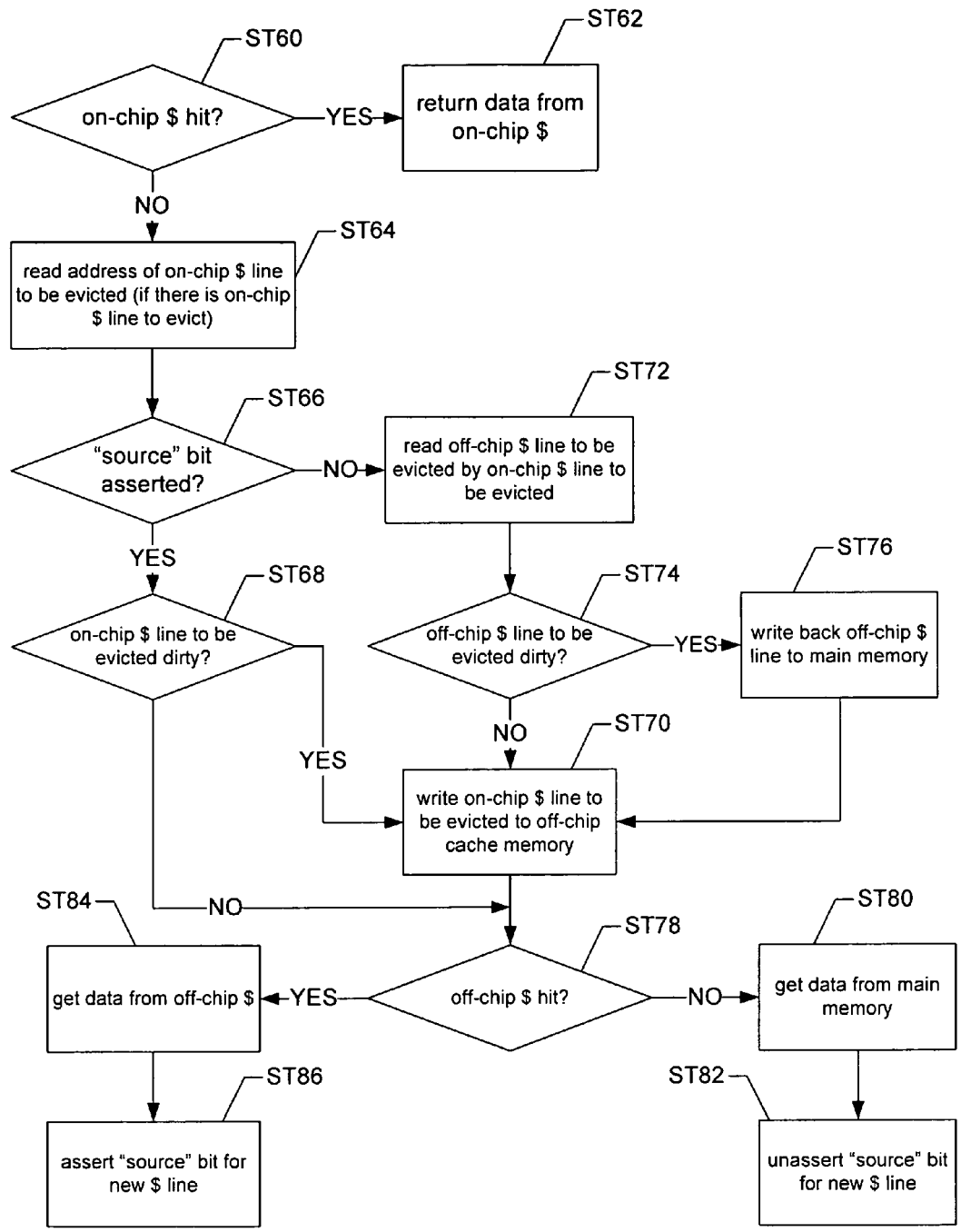
FIG. 5 shows a flow process in accordance with an embodiment of the present invention.

FIG. 5 shows a flow process in accordance with an embodiment of the present invention. If a "cache hit" occurs in "on-chip" cache memory ("$" referring to "cache memory" in FIG. 5) ST60, the "on-chip" cache memory returns the requested data to the requesting entity (e.g., CPU 14 in FIG. 1) ST62. Otherwise, if a "cache miss" occurs in the "on-chip" cache memory ST60, an address of the "on-chip" cache memory cache line to be evicted is read ST64. Those skilled in the art will note that in one or more embodiments of the present invention, if the "difference" field of the address of the requested data matches the "difference" field in one of the ways of the selected set in the "on-chip" cache memory (yet still a "cache miss"), that way is the one to be evicted.

If the "source" state bit of the "on-chip" cache memory cache line to be evicted is asserted ST66, a determination is made as to whether this cache line is "dirty" ST68. If the "on-chip" cache memory cache line to be evicted is "dirty," this cache line is written to the "off-chip" cache memory (thereby resulting in an "off-chip" cache memory access) ST70.

If the "source" state bit of the "on-chip" cache memory cache line to be evicted is not asserted ST66, the "off-chip" cache memory cache line to be evicted by the "on-chip" cache memory cache line to be evicted is read (thereby resulting in an "off-chip" cache memory access) ST72. Then, if the "off-chip" cache memory cache line to be evicted is "dirty" ST74, this cache line is written back to main memory ST76; otherwise, the "on-chip" cache memory cache line to be evicted is written to the "off-chip" cache memory (thereby resulting in an "off-chip" cache memory access) ST70.

After ST70 or if the "on-chip" cache memory cache line to be evicted is not "dirty" as determined in ST68, a determination is made to whether the address "missed" in the "on-chip" cache memory "hits" in the "off-chip" cache memory (thereby resulting in an "off-chip" cache memory access) ST78. If there is a "cache miss" in the "off-chip" cache memory, the requested data is retrieved from main memory ST80, upon which the "source" state bit for the new "on-chip" cache memory cache line containing the retrieved data is unasserted ST82. On the other hand, if there is a "cache hit" in the "off-chip" cache memory, the appropriate "off-chip" cache memory cache line is written to the "on-chip" cache memory ST84, upon which the "source" state bit for the new "on-chip" cache memory cache line is asserted ST86.

In one or more embodiments of the present invention, an "on-chip" cache memory may be direct-mapped. In one or more other embodiments of the present invention, an "on-chip" cache memory may be fully associative. In one or more other embodiments of the present invention, an "on-chip" cache memory may be n-way set associative.

In one or more embodiments of the present invention, an "off-chip" cache memory may be direct-mapped.

Further, those skilled in the art will note that "on-chip" and "off-chip" cache memories in accordance with one or more embodiments of the present invention may implement any type, number, and/or combination of write and replacement policies.

Further, those skilled in the art will note that "on-chip" and "off-chip" cache memories in accordance with one or more embodiments of the present invention may be of any size.

Further, those skilled in the art will note that "on-chip" and "off-chip" cache memories in accordance with one or more embodiments of the present invention may be implemented in any type of memory circuit.

Figure 6:
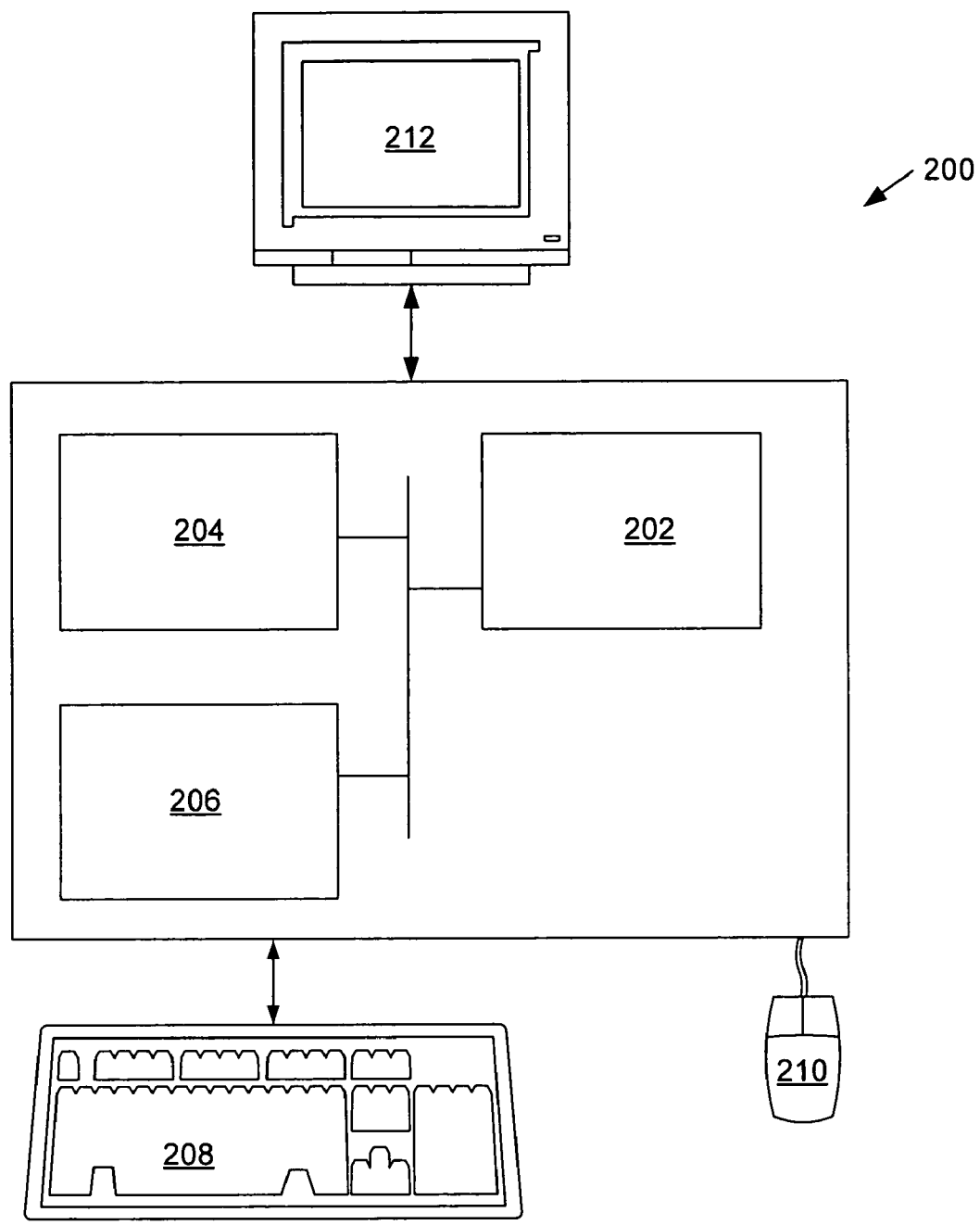
FIG. 6 shows a computer system in accordance with an embodiment of the present invention.

Further, an embodiment of the present invention may be associated with virtually any type of computer system regardless of the platform being used. For example, as shown in FIG. 6, a networked computer system 200 includes a processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform embodiments of the invention may be stored on a computer readable medium such as a compact disc ("CD"), a diskette, a tape, a file, or any other computer-readable storage device.

Advantages of the present invention may include one or more of the following. In one or more embodiments of the present invention, because "off-chip" cache memory bandwidth requirements are reduced due to a lesser amount of needed "off-chip" cache memory accesses, processing performance may be improved.

In one or more embodiments of the present invention, because "off-chip" cache memory bandwidth requirements are reduced due to a lesser amount of needed "off-chip" cache memory accesses, cost may be reduced due to, for example, requiring less integrated circuit pins, thereby also possibly simplifying board routing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a processor;
    a main memory operatively connected to the processor;
    a first cache memory adjacent to the processor, wherein the first cache memory is an on-chip cache; and
    a second cache memory external to the processor,
    wherein a cache line entry in the first cache memory is associated with a state bit indicative of whether data in the cache line entry was retrieved directly from the main memory or the second cache memory.

2. The system of claim 1, wherein the processor is configured to forward an address of requested data to the first cache memory.

3. The system of claim 2, wherein the address comprises a first group of bits representing an index for the first cache memory and a second group of bits representing an index for the second cache memory, and wherein the second group of bits includes the first group of bits and at least one other bit.

4. The system of claim 2, wherein the address comprises at least one of a group of bits representing a tag for the first cache memory and another group of bits representing a tag for the second cache memory.

5. The system of claim 1, wherein the first cache memory is at least one of a direct-mapped cache memory, a fully-associative cache memory, and an n-way set-associative cache memory.

6. The system of claim 1, wherein the second cache memory is a direct mapped cache memory.

7. The system of claim 1, wherein the second cache memory is a victim cache memory.

8. The system of claim 1, wherein the second cache memory is a write-back cache memory.

9. A method of performing computer system operations, comprising:
    determining whether a cache miss occurs in an on-chip cache memory; and
    if the cache miss occurs, writing requested data to the on-chip cache memory from one from a group consisting of an off-chip cache memory and a main memory, wherein the one from the group is selected depending on a bit associated with an on-chip cache memory cache line to be evicted that indicates whether the on-chip cache memory cache line to be evicted was sourced from the off-chip cache memory or directly from the main memory.

10. The method of claim 9, further comprising:
    if a cache miss does not occur, returning data from the on-chip cache memory.

11. The method of claim 9, wherein the cache miss occurs, further comprising:
    if the on-chip cache memory cache line to be evicted was sourced from the off-chip memory, determining whether the on-chip cache memory cache line to be evicted is dirty; and
    if the on-chip cache memory cache line to be evicted is dirty, writing the on-chip cache memory cache line to be evicted to the off-chip cache memory.

12. The method of claim 9, wherein the cache miss occurs, further comprising:
    if the on-chip cache memory cache line to be evicted was sourced from the main memory, reading an off-chip cache memory cache line to be evicted, wherein the off-chip cache memory cache line is displaced by the on-chip cache memory cache line to be evicted; and
    determining whether the off-chip cache memory cache line to be evicted is dirty.

13. The method of claim 12, further comprising:
    if the off-chip cache memory cache line to be evicted is dirty, writing back the off-chip cache memory cache line to be evicted to the main memory.

14. The method of claim 12, further comprising:
    if the off-chip cache memory cache line to be evicted is not dirty, writing the on-chip cache memory cache line to be evicted to the off-chip cache memory.

15. The method of claim 9, further comprising:
    determining whether a cache miss occurs in the off-chip cache memory.

16. The method of claim 15, further comprising:
    if a cache miss occurs in the off-chip cache memory, writing the requested data to the on-chip cache memory from the main memory, and
    unasserting the bit to indicate that the written data was sourced from the main memory.

17. The method of claim 15, further comprising:
    if a cache miss does not occur in the off-chip cache memory,
    writing the requested data to the on-chip cache memory from the off-chip cache memory, and
    asserting the bit to indicate that the written data was sourced from the off-chip cache memory.

18. The method of claim 9, wherein the first cache memory is at least one of a direct-mapped cache memory, a fully-associative cache memory, and an n-way set-associative cache memory.

19. The method of claim 9, wherein the second cache memory is a direct mapped cache memory.

20. The method of claim 9, wherein the second cache memory is a victim cache memory.

21. The method of claim 9, wherein the second cache memory is a write-back cache memory.

22. A method of performing computer system operations, comprising:
    executing a computer operation;
    requesting data needed for the executing, where the requesting comprises issuing an address of the requested data to an on-chip cache memory, wherein a bit associated with the off-chip cache memory indicates whether the requested data was sourced from the off-chip cache memory or directly from the main memory; and
    searching for the requested data in the on-chip cache memory using a portion of a first tag field in the address,
    wherein the portion of the first tag field forms at least part of an index field in the address for an off-chip cache memory, and wherein the portion of the first tag field does not form at least part of an index field in the address for the on-chip cache memory.

23. The method of claim 22, further comprising:
    if the requested data is not found in the on-chip cache memory, determining whether a portion of a cache line in the on-chip cache memory matches the portion of the first tag field;
    if there is a match, reading an address of the cache line and evicting the cache line;
    determining whether the evicted cache line was sourced from the off-chip cache memory; updating the off-chip cache memory dependent on the determining; and
    selectively retrieving the requested data from one of a group consisting of the off-chip cache memory and a main memory.

24. The method of claim 22, further comprising:
    if the requested data is not found in the on-chip cache memory, determining whether a portion of a cache line in the on-chip cache memory matches the portion of the first tag field;
    if there is no match, reading an address of a cache line least recently used and evicting the cache line;
    determining whether the evicted cache line was sourced from the off-chip cache memory;
    updating the off-chip cache memory dependent on the determining; and
    selectively retrieving the requested data from one of a group consisting of the off-chip cache memory and a main memory.

25. The method of claim 22, further comprising:
    if the requested data is not found in the on-chip cache memory, reading an address of an on-chip cache memory cache line to be evicted;
    based on the reading, determining whether the on-chip cache memory cache line to be evicted was sourced from the off-chip cache memory.

26. The method of claim 25, further comprising:
    if the on-chip cache memory cache line to be evicted was sourced from the off-chip cache memory, determining whether the on-chip cache memory cache line to be evicted is dirty; and if the on-chip cache memory cache line to be evicted is dirty, writing the on-chip cache memory cache line to be evicted to the off-chip cache memory.

27. The method of claim 25, further comprising:

if the on-chip cache memory cache line to be evicted was not sourced from the off-chip cache memory, reading an address of an off-chip cache memory cache line to be evicted, wherein the off-chip cache memory cache line is displaced by the on-chip cache memory cache line to be evicted;

determining whether the off-chip cache memory cache line to be evicted is dirty;

if the off-chip cache memory cache line to be evicted is dirty, writing back the off-chip cache memory cache line to be evicted to a main memory; and if the off-chip cache memory cache line to be evicted is not dirty, writing the on-chip cache memory cache line to the off-chip cache memory.

28. The method of claim 22, further comprising:

if the requested data is not found in the on-chip cache memory, searching for the requested data in the off-chip cache memory.

29. The method of claim 28, further comprising:

if the requested data is found in the off-chip cache memory, write the requested data to the on-chip cache memory from the off-chip cache memory, and assert the bit to indicate the requested data was sourced from the off-chip cache memory.

30. The method of claim 28, further comprising:

if the requested data is not found in the off-chip cache memory, write the requested data to the on-chip cache memory from a main memory, and unassert the bit to indicate the requested data was sourced from the main memory.

* * * * *

UNITED STATES PATENT AND TRADEMARK OFFICE
CERTIFICATE OF CORRECTION

PATENT NO. : 7,325,101 B1 Page 1 of 1
APPLICATION NO. : 11/141415
DATED : January 29, 2008
INVENTOR(S) : Sorin Iacobovici et al.

It is certified that error appears in the above-identified patent and that said Letters Patent is hereby corrected as shown below:

In the Claims:

In Claim 22, column 8, line 17, the word, "off-chip" should be --on-chip--.

Signed and Sealed this

Twenty-seventh Day of May, 2008

JON W. DUDAS
*Director of the United States Patent and Trademark Office*